United States Patent
Kummerer et al.

(10) Patent No.: US 6,522,954 B1
(45) Date of Patent: Feb. 18, 2003

(54) SMART CONTROL STRATEGY FOR REGULATING A TEMPERATURE CONTROLLER

(76) Inventors: Christoph Kummerer, Frühlingstrasse 67, 82131 Gauting (DE); Norbert Kummerer, Graf-Buttler-Strasse 7, 85778 Haimhausen (DE)

( * ) Notice: Subject to any disclaimer, the term of this patent is extended or adjusted under 35 U.S.C. 154(b) by 0 days.

(21) Appl. No.: 09/360,653

(22) Filed: Jul. 26, 1999

(51) Int. Cl.[7] .............. G05B 13/00; G05B 15/00; G05B 21/00; G05D 23/00; G01M 1/38
(52) U.S. Cl. .............. 700/278; 700/276; 700/300
(58) Field of Search .............. 700/276, 278, 700/299, 300, 306, 32–35; 702/99, 130; 236/91 R, 91 D, 91 F, 93 R

(56) References Cited

U.S. PATENT DOCUMENTS

| | | | | |
|---|---|---|---|---|
| 4,298,943 A | * | 11/1981 | Thompson et al. | 700/276 |
| 4,356,961 A | | 11/1982 | Smith | 236/1 EA |
| 4,674,027 A | | 6/1987 | Beckey | 700/14 |
| 4,771,392 A | | 9/1988 | Hall | 700/278 |
| 4,799,176 A | * | 1/1989 | Cacciatore | 700/278 |
| 5,038,851 A | | 8/1991 | Mehta | 165/238 |
| 5,115,968 A | * | 5/1992 | Grald | 236/78 D |
| 5,192,020 A | | 3/1993 | Shah | 236/46 R |
| 5,270,952 A | * | 12/1993 | Adams et al. | 700/278 |
| 5,555,927 A | | 9/1996 | Shah | 165/239 |
| 5,761,083 A | * | 6/1998 | Brown, Jr. et al. | 700/296 |
| 6,278,909 B1 | * | 8/2001 | Thibeault et al. | 700/286 |

FOREIGN PATENT DOCUMENTS

| | | |
|---|---|---|
| DE | 3511435 A1 | 10/1986 |
| DE | 4226383 A1 | 2/1994 |
| EP | 0 192 228 | 8/1986 |
| GB | 2222006 A | 2/1990 |
| JP | 6-168034 A | 6/1994 |

* cited by examiner

*Primary Examiner*—Leo Picard
*Assistant Examiner*—Ryan Jarrett
(74) *Attorney, Agent, or Firm*—Nixon Peabody LLP; Stuart J. Friedman

(57) ABSTRACT

A smart control strategy/system for regulating a temperature controller for supplying or exhausting heat to/from a room, object or the like. The actual temperature of a room, object or the like requiring temperature control is prompted to dither between a specifiable maximum and specifiable minimum temperature setpoint by signaling the temperature controller periodically on/off. The profile of the actual temperature is continually monitored and the changes in the profile of the actual temperature resulting as a reaction to ON/OFF of the temperature controller are made use of to determine optimum ON/OFF points in time of the temperature controller.

14 Claims, 2 Drawing Sheets

SMART CONTROL STRATEGY FOR REGULATING A TEMPERATURE CONTROLLER

FIELD OF THE INVENTION

The invention relates to a smart control strategy for regulating a temperature controller for supplying or exhausting heat to/from a room, object or fluid.

BACKGROUND OF THE INVENTION

No such smart regulating control strategy was known hitherto. What is known are self-optimizing control systems for regulating room heating, requiring, however, the user to first input a wealth of information as to nature of the heating, the supply flow temperature, the heat losses for various indoor and outdoor temperatures, and so on. It is especially in the case of systems very slow to react, such as those used as a rule in domestic heating systems, as well as in initiating changed setpoint temperatures, that these self-optimizing closed-circuit controllers are unable to prevent a relatively strong overshoot or undershoot of the setpoint temperature. Aside from this, presetting the control parameters is often a highly complicated business in some cases and necessitates much trial and error before arriving at a satisfactory result in functioning.

Also known, of course, are thermostats for regulating living room heating radiators which signal the heating ON/OFF, e.g., via a valve or a circulating pump as soon as a critical setpoint temperature is violated. The ON/OFF hysteresis is usually of the order of 0.5 to 1° C., even as much as 2° C. in the case of unsophisticated radiator thermostat valves. It is this ON/OFF response of such thermostat regulators that results in room temperature fluctuating seriously, due to the heating system not being able to instantly react to the control signals of the regulator, but only after a considerable delay. Should the thermostat signal the heating OFF, for example, the radiators which are still hot at this time will continue to radiate heat to the surrounding room for quite a few minutes, thus resulting in room temperature significantly increasing above the setpoint temperature. In the reverse situation, when the regulator signals the heating back ON, it will take quite some time until the radiators again become hot, and during this time room temperature drops even further below the setpoint temperature.

This overshoot/undershoot nuisance is aggravated furthermore by the relatively wide hysteresis of thermostatic regulators inherent in their design.

SUMMARY OF THE INVENTION

It is on the basis of that said above that the object of the invention is to define a smart control strategy having no need of prior information as to the nature of the heating or cooling required, as to the ambient conditions, especially as regards the temperature losses between the room, object or fluid to be heated and the colder surroundings or, respectively, as regards the heat transfer from the higher temperature surroundings to the room, object or fluid to be cooled, and which not only assures the setpoint temperature desired by the user being maintained very accurately, but also permits speedy achievement of this setpoint temperature with no serious overshoot/ undershoot thereof. In addition to this, the strategy is also intended for use with or facilitated retrofitting to existing heating or cooling systems.

This object is achieved, for one thing, by a smart control strategy for regulating a temperature controller for supplying or exhausting heat to/from a room, object or fluid in which a maximum temperature setpoint (setpoint-MAX) and a minimum temperature setpoint (setpoint-MIN) is specified and the time profile of the actual temperature of the room, object or fluid is regularly measured, comprising the following steps:

defining an nth ON point in time (t-ON(n)) at which the temperature controller is to be signaled ON, defining an nth OFF point in time (t-OFF(n)) at which the temperature controller is to be signaled OFF, sensing the two nth extreme values (actual-MAX(n) and actual-MIN(n)) resulting after ON of the temperature controller in the actual temperature profile in which the actual temperature has a local minimum and a local maximum, determining the 1st derivation of the time profile with time in the nth ON point in time (t-ON(n)), determining the optimum nth ON/OFF points in time (t-optON(n) and t-optOFF(n)) from the values of the nth OFF point in time (t-OFF(n)) and the nth ON point in time (tON(n)), the two nth extreme values (actual-MAX(n) and actual-MIN(n)) in the temperature profile and the 1st derivation of the temperature profile with time in the nth ON point in time (t-ON(n)) at which for the nth extreme value (actual-MAX(n)) a local maximum in the temperature profile equaling the specified maximum temperature setpoint (setpoint-MAX(n)) and for the nth extreme value (actual-MIN(n)) a local minimum in the temperature profile equaling the specified minimum temperature setpoint (setpoint-MIN(n)) is attained, incrementing n by 1 and repeating the steps a) to f) taking into account the determined nth ON/OFF points in time (t-optON(n) and t-optOFF(n)) as well as the 1st derivation of the temperature profile with time in the nth ON point in time (t-ON(n)) in establishing the n+1 ON/OFF points in time (t-ON(n+1) and t-OFF(n+1)).

The gist of the invention is thus based on the fact that the temperature of any room, object or fluid to be heated or cooled will always dither about the actually desired setpoint due to the inertia of the heating or cooling system and due to ambient losses. Whilst in the case of simple thermostats only one setpoint is specified which when exceeded results in the heating being signaled OFF and when no longer attained results in the heating being signaled ON, in the control strategy in accordance with the invention two setpoints are specified. These two setpoints mark the maximum swing of the dither about the temperature value as lastly desired, thereby automatically sensing the reaction of the room, object or fluid to a heating or cooling action and taking it into account when the heating or cooling system is next signaled ON. The strategy thus learns the parameters needed for optimum regulation of the corresponding temperature controller without the user having to specify them beforehand. Should the strategy "see" for instance that a radiator is still giving off relatively too much heat to the room to be heated after the OFF signal has been given, resulting in the actual temperature exceeding the specified maximum setpoint temperature, then the radiator is signaled off correspondingly earlier in the next heating cycle.

One major advantage afforded by the strategy is that it may be put to use for all kinds of temperature control applications, such as e.g. oil, gas, electric heating, hot air fans, heating coils, heating or cooling elements on heating agent/coolant flow, especially cooling elements in refrigerators, cold rooms and air-conditioning facilities, etc.

It is also irrelevant for the strategy whether heat needs to be supplied to or exhausted from a room or object, i.e. the strategy can be put to use in the temperature control of houses, industrial buildings, rooms, tents, vehicle interiors, baking ovens, refrigerator rooms, cold stores, refrigerator trailer vehicles, trains and the like since it automatically establishes the ambient parameters needed for optimum regulation.

In one particularly simple embodiment of the control strategy with no change in the setpoints, setpoint-MAX/MIN, the ON point in time t-ON(n+1) (relative to the temperature profile) is set=t-optON(n) and/or the OFF point in time t-OFF(n+1) (again relative to the temperature profile) is set=t-optOFF(n). It is, of course, clear that instead of the relative ON point in time the strategy will work just as well with the absolute ON point in time. In such a case, of course, a constant time factor needs to be added to the values t-optON(n) and t-optOFF(n). In other words, the strategy may be implemented either so that relative optimum ON/OFF points in time are established for the temperature controller, it being good practice to determine the ON point in time of the temperature controller relative to the actual temperature (i.e. e.g. ON at 20° C.) and the OFF point in time relative to the ON point in time (i.e. e.g. OFF after 5 min), or to operate with absolute times (i.e. e.g. ON at 12.05 hours, OFF at 12.10 hours, etc.).

The stability of the regulation may be further enhanced by in addition establishing the time interval between the ON point in time (t-ON(n)) and the local minimum (actual-MIN(n)) when the temperature controller is used for heating or, respectively between the ON point in time t-ON(n+1) and the local maximum (actual-MAX(n)) when the temperature controller is used for cooling. This time interval is additionally taken into account when defining the n+1th OFF point in time t-OFF(n+1). For this purpose it is expedient to define the n+1th OFF point in time t-OFF(n+1) so that an ON duration of the temperature controller materializes corresponding to at least the cited time interval multiplied by a correction factor.

In one expedient variant of the control strategy that after ON of the temperature controller at the ON point in time t-ON(n+1), the 1st derivation of the temperature profile is continually sensed with time and the temperature controller is signaled OFF only when timeout of the defined OFF point in time t-OFF(n) is attained and a local minimum (actual-MIN(n)) and local maximum (actual-MAX(n)) has occurred in the heating temperature profile and cooling temperature profile respectively, and the 1st derivation of the temperature profile with time is greater or smaller than a specified value in heating and cooling respectively, and the actual temperature is greater than the minimum temperature setpoint (setpoint-MIN) or smaller than the maximum temperature setpoint (setpoint-MAX) in heating and cooling respectively.

The control strategy may also be simplified to advantage by doing away with establishing an OFF point in time t-OFF(n), making OFF of the temperature controller dependent only on a local maximum or local minimum being passed, on a certain minimum slope of the temperature curve and on the minimum temperature setpoint being achieved.

For defining the ON point in time t-ON(n+1) in one preferred embodiment of the strategy, at least the three values t-optON(n), t-optON(n−1) and t-optON(n−2) are arranged in size and median-filtered, i.e. selecting the mean value as the value for t-ON(n+1). Employing such a median-filter has the advantage that any "renegades" are smoothed out whilst, however, sensing actual changes in the ambient conditions and updating the control strategy accordingly. When, e.g., at very low outdoor temperatures a window is opened for a short time, it could happen that the maximum temperature value actual-MAX resulting at the end of the heating cycle fails to approximate the selected setpoint, setpoint-MAX. Alternatively, although the actual value approximates the setpoint, a temperature sensor sensing the actual temperature wrongly signals too low a room temperature due to it being unfortunately located in the vicinity of the open window.

So that brief opening of the window does not result in the room being overheated on the next heating cycle, the at least last three computed optimum ON/OFF points in time are each arranged according to size and the mean value thereof in each case is taken over as the next ON/OFF points in time to thus avoid "renegades" influencing control. Should, however, the ambient conditions change, for instance by there being a sharp drop in temperature, thus actually requiring heating for a longer time to attain the desired setpoint temperatures, then these changed ambient conditions override after but a few cycles depending on the number of the optimum ON/OFF points in time as computed for use in median-filtering. When, e.g., three ON/OFF points in time are each arranged according to size and the mean value selected in each case, then any change in the ambient conditions will already result in the second cycle in a changeover to the correspondingly changed new optimum ON/OFF points in time.

As an alternative or in addition thereto, the strategy may be designed so that a limit value is specified for the 1st derivation of the temperature profile with time which when violated (corresponding to a sudden jump or drop in temperature, e.g. due to a window being opened) results in the values measured thereafter for defining the optimum ON/OFF points in time, until the occurrence of a specifiable condition, especially dropping below an absolute minimum temperature or change in the temperature profile, no longer being taken into account. When the strategy in accordance with the invention is used for room heating control it may be provided that the heating is signaled OFF on a sudden drop in temperature until a minimum in the temperature profile is attained, thus reliably preventing "heating for the birds".

The strategy may be used to advantage so that the user merely needs to specify one temperature setpoint from which the values of the setpoint-MAX and setpoint-MIN are automatically defined. When the strategy in accordance with the invention is used for heating regulation, all the user needs to specify is the median temperature desired—as in known methods of control—from which then the setpoint-MIN and setpoint-MAX values are defined as a function of how sensitive the apparatus are for defining the actual temperature. When, e.g., a temperature sensor is used which is accurate to 0.05° C. it is good practice to select the spacing between setpoint-MIN and setpoint-MAX between 0.3 and 0.4 ° C. This results in room temperature being regulated to an accuracy of ±0.15° C. or, respectively, ±0.2° C. about the median setpoint desired by the user, i.e. the more sensitive the temperature sensors used, the more accurate is the control.

In one expedient embodiment of the strategy, it is provided that the setpoints, setpoint MAX and setpoint MIN, as well as the ON/OFF points in time, t-ON(n) and t-OFF(n), defined lastly relative to these setpoints are memorized in a memory unit. When there is a change in the setpoints the memory is checked to see whether ON/OFF points in time are already memorized for the changed setpoints which are then taken over as the ON/OFF points in time for the first cycle of the control strategy with the new setpoints. This embodiment permits a particularly precise achievement of changed setpoint temperatures in the first cycle of the control without the strategy first needing to obtain information as to possible optimum ON/OFF points in time, since these are already memorized.

In one advantageous embodiment of the strategy, t-ON(n) and t-OFF(n) are defined by means of a central analyzer/control unit with which corresponding control commands for signaling the temperature controller ON/OFF are also generated. In this arrangement the control commands are transmitted from the central analyzer/control unit to the temperature controller wireless or wired. In wireless remission it is good practice to make use of commercially available radio transceiver units which have since become very moderate in price and operate preferably at the frequency of 433 MHz released for general applications. In wired transmission it is good practice to make use of wiring already installed, such as e.g. "baby phone" systems.

When the control strategy is employed for regulation of a temperature controller passing a heating agent/coolant flow wherein the temperature of the heating agent or coolant is adjustable, the strategy may be implemented to advantage in defining and setting the difference required between the heating agent/coolant temperature and the actual temperature (termed supply flow temperature (VT) in the following) from the time interval as measured between t-ON(n) and t-OFF(n) (termed ON duration (D(n)) in the following), as well as from the time interval as measured between the local extreme values actual-MAX(n−1) and actual-MIN(n)—when the temperature controller is used for heating—or, respectively, as well as from the time interval as measured between the local extreme values actual-MIN(n) and actual-MAX(n)—when the temperature controller is used for cooling (termed half cycle (HC(n)) in the following), comprising the following steps:

lowering the supply flow temperature (VT) by a fraction (B) and modifying the heating agent/coolant temperature accordingly if the ON duration (D(n)) is smaller than the half cycle (HC(n)) multiplied by a factor (F), elevating the supply flow temperature (VT) by a fraction (B) and modifying the heating agent/coolant temperature accordingly if the ON duration (D(n)) is greater than the half cycle (HC(n)) multiplied by a factor (F), redefining the OFF point in time (t-OFF(n+1)) as it reads from the methods described in paragraph "f)" on page 3 hereof and on page 4 hereof so that the ON duration (D(n+1)) in case a) is lengthened by the fraction (B) and in case b) is shortened by the fraction (B).

This embodiment of the strategy permits a particularly energy-saving way of heating or cooling due to the coolant not needing to be cooled unduly below the desired median setpoint temperature or, respectively, due to the heating agent not needing to be heated unduly above the desired median setpoint temperature, since all the more energy is wasted the greater the difference between the coolant/heating agent temperature and the desired setpoint temperature.

In one expedient alternative of the control strategy, instead of a half cycle (HC(n)) the time interval between the local maxima (actual-MAX(n−1) and (actual-MAX(n)) is measured (termed full cycle (FC(n)) in the following), this full cycle (FC(n)) being taken into account instead of the half cycle (HC(n)) in the strategy as described in the previous paragraph.

In a further expedient alternative the difference required between heating agent/coolant temperature and the actual temperature (termed supply flow temperature (VT) in the following) is defined and set from the continually defined 1st derivation of the temperature profile with time in the heated or cooled room, object or fluid, comprising the steps:

forming the arithmetic mean from the amounts of the defined 1st derivations of the temperature profile with time in the time interval between the temperature extreme values actual-MAX(n−1) and actual-MIN(n) (termed median (1) in the following) as well as in the time interval between the temperature extreme values actual-MIN(n) and actual-MAX(n) (termed median (2) in the following), lowering the supply flow temperature (VT) by a fraction (B) and modifying the heating agent/coolant temperature accordingly if median (1) is smaller than median (2) multiplied by a factor (F), elevating the supply flow temperature (VT) by a fraction (B) and modifying the heating agent/coolant temperature accordingly if median (1) is greater than median (2) multiplied by a factor (F), redefining the OFF point in time (t-OFF(n+1)) as it reads from claims 1 and 2 so that the ON duration (D(n+1)) in case b) is lengthened by the fraction (B) and in case c) is shortened by the fraction (B).

As an alternative to the above a fixed value may be specified instead of the arithmetic mean from the 1st derivations of the temperature profile with time (median (1)).

The control strategy may be put to use advantageously when it is not the heating agent/coolant temperature but the heating/cooling power that is to be regulated, this being particularly the case when the temperature controller is electrically powered. In this case the control strategy as described is put to use with the modification that instead of the difference between heating agent/coolant temperature and the actual temperature (i.e. the supply flow temperature (VT)) it is the heating power in each case that is elevated or lowered.

Defining the heating agent/coolant temperature or the heating/cooling power may be done to advantage by means of a central analyzer/control unit by means of which also corresponding control commands for setting the heating agent/coolant temperature or the heating/cooling power may be generated and transmitted to the temperature controller wireless or wired.

BRIEF DESCRIPTION OF THE DRAWINGS

Further details and advantages of the invention read from the following description in conjunction with the drawing in which:

FIG. 4 is a graph plotting the actual temperature profile as a function of time with control of a heating system in

DESCRIPTION OF THE PREFERRED EMBODIMENTS

Figure 1:
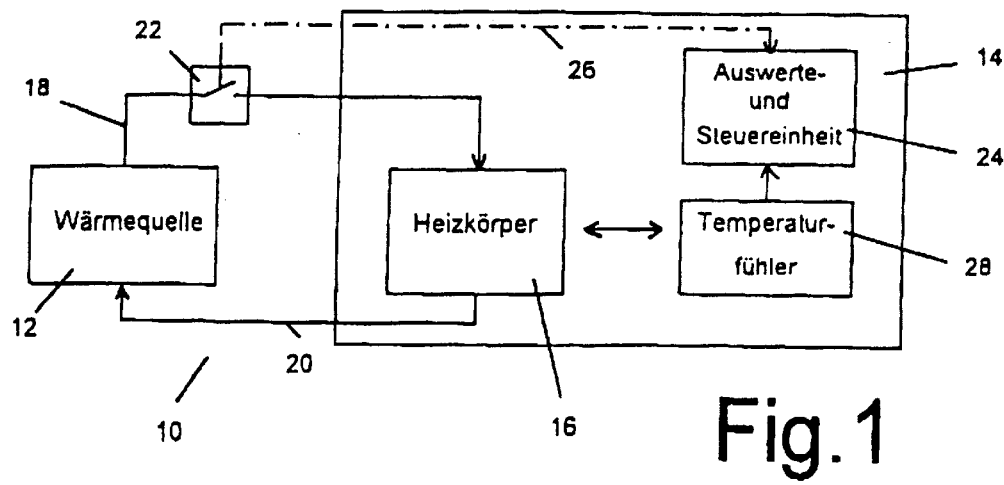
FIG. 1 is a single-line diagram of a room-heating temperature controller controlled by means of the strategy in accordance with the invention.

Referring now to FIG. 1 there is illustrated a temperature controller identified in its entirety by the reference numeral 10, substantially comprising a source of heat 12, e.g. an oil burner, and a radiator 16 located in the room 14 to be heated. Source of heat 12 and radiator 16 are connected via piping 18 and 20 for the heating agent, e.g., water which is supplied via the piping 18 (the so-called supply) to the radiator 16 from which the so-called return 20 is returned to the source of heat 12 for reheating. Incorporated in the supply 18 is a valve 22 which in the example embodiment has only two switching conditions, namely either fully open or fully closed. The valve is controlled by means of a central analyzer/control unit 24 which generates corresponding control signals and transmits them to the valve 22 as indicated by the broken line 26. For sensing the actual temperature a temperature sensor 28 is disposed in the room 14, this temperature sensor being coupled to the central analyzer/control unit 24 to which it continually signals the temperature values as measured.

Figure 2:
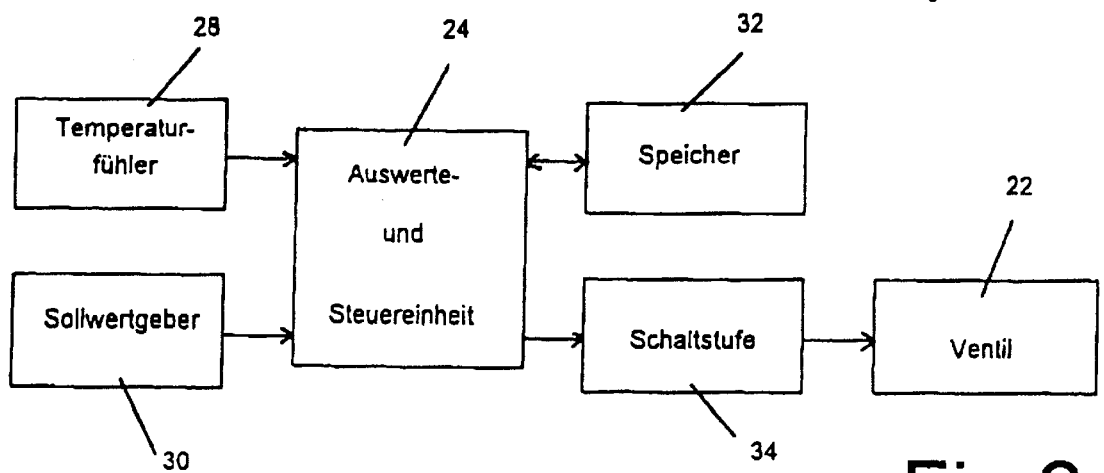
FIG. 2 is a single-line diagram of a regulating control system including a central analyzer/control unit.

Referring now to FIG. 2 it is obvious that practically, the central analyzer/control unit 24 is coupled not only to a temperature sensor 28 but also to a corresponding setpoint generator 30, e.g., a keypad or dial by means of which the user of the strategy or the controller is able to set a temperature as desired. Further, a memory 32 is expediently provided to which the central analyzer/control unit has access for depositing and retrieving data. In such a memory, e.g., optimum ON/OFF points in time possible for various temperature setpoints not currently set can be deposited. Depending on the type and configuration of the valve 22, a switching stage 34 is practically interposed between the central analyzer/control unit 24 and valve 22, this switching stage converting the control signals generated by the central analyzer/control unit into a physical movement of the valve 22. In this arrangement—as evident from FIG. 3—it is also possible to provide between the switching stage 34 moving the valve and the central analyzer/control unit 24 two transceiver units 36 and 38 by means of which the control signals generated by the central analyzer/control unit 24 and converted by the switching stage 34 are transmitted wireless or wired.

Figure 3:
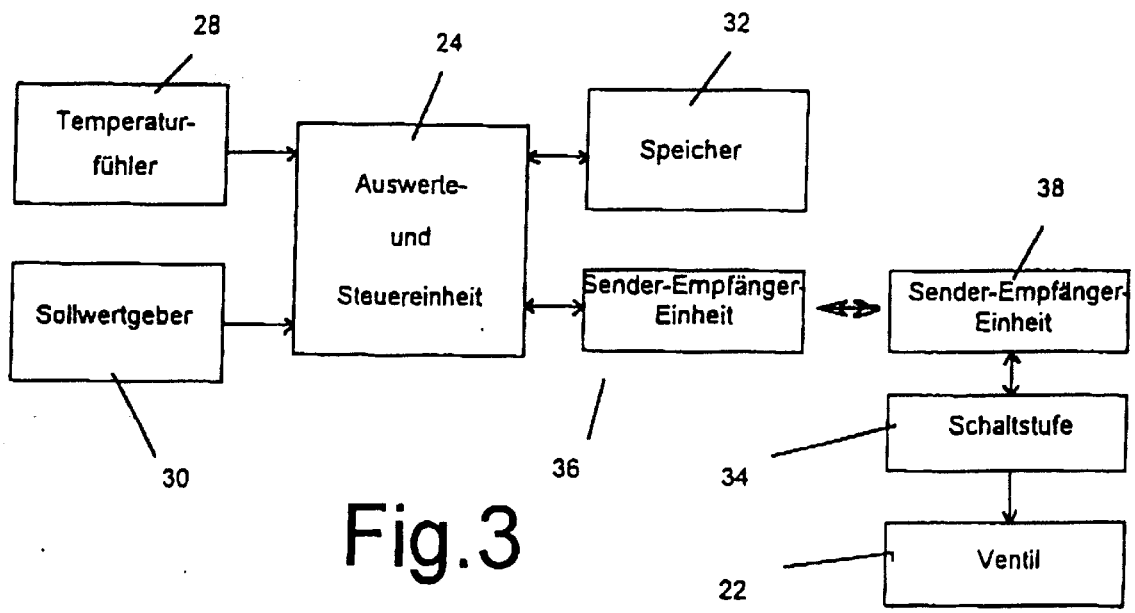
FIG. 3 is a single-line diagram of the regulating control system as shown in FIG. 2 in which two transceiver units are provided, however, for transmitting corresponding control signals between the temperature controller and the analyzer/control unit.

Referring now to FIG. 3 there is illustrated an arrangement in which correct reception of the corresponding control signals by the transceiver unit 38 assigned to the switching stage 34 is confirmed by a corresponding okay signal being generated which is in turn received by the transceiver unit 36 and checked by the central analyzer/control unit 24. Should this check indicate that the control signal was not received, or only incompletely, a corresponding alarm is generated which is output visually and/or acoustically by a display known as such and therefore not shown. As an alternative or in addition thereto it is also possible on an alarm that the control signals are firstly retransmitted since glitches in transmission may occur, especially in wireless transmission, which necessitate no intervention on the part of the user of the strategy or of the controller.

Figure 4:
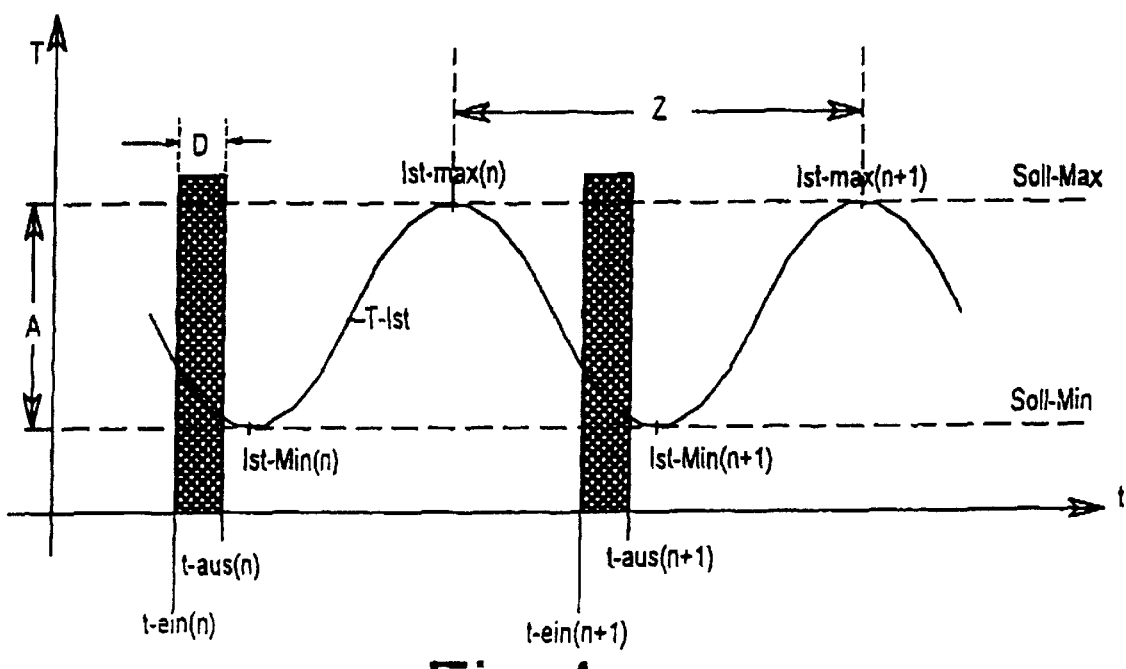

Referring now to FIG. 4 there is illustrated a plot to which reference is made in explaining in detail how the smart control strategy in accordance with the invention is used in regulating a heating system incorporating a radiator. The gist of the invention is based on the heating and the room to be heated forming a system which may be prompted to dither in temperature. From the way in which this is prompted and the temperature profile resulting in response to a specific prompt, information as to the system and its actual condition may be continually obtained. This information is sufficient to generate a controlled small amplitude temperature dither about a setpoint which may approximate this setpoint arbitrarily. In accordance with the invention, for this purpose the radiator is signaled ON periodically and in-phase until a temperature dither materializes having defined minima and maxima located below and above a setpoint respectively by very small amounts so that the setpoint can be approximated very precisely. Deviations of the dither actually occurring from the anticipated dither are made use of by the smart regulation control strategy to correct the prompt, i.e., the ON point in time and OFF point in time or ON duration of the radiator. The strategy thus continually tests the response of the system and defines from its reaction the optimum ON/OFF points in time for the radiator.

It is in this way that an excellent regulating accuracy is achieved despite the high inertia usually encountered in heating systems. The strategy requires no presettings whatsoever since it fetches all parameters from the system itself and continually adapts them. It reacts very quickly to changes in ambient conditions since the parameters are continually checked even in the settled condition, i.e., any changes are "seen" and compensated as soon as they begin to materialize. For sensing the temperature profile a single temperature sensor is sufficient. All that is required of the temperature controller—i.e., the heating in the present example—is that the heating cycle may be switched ON/OFF via a circulating pump or a valve. Proportional final control elements are not needed. There is no need for any further data of the temperature controller being known.

To achieve the regulating principle in accordance with the invention the profile of the room temperature needs to be related to the ON point in time and ON duration D of the radiator. Once the ON point in time and ON duration or OFF point in time are known the parameters for solving the relationship equations can be determined from measuring the actual temperature profile in the heated room; vice-versa, solving the equations permits forecasting the future temperature profile. Then, from comparing the anticipated temperature profile to the real temperature profile as measured, changes in the ambient conditions can be read off and used to correct the parameters. These steps need to be repeated cyclically in specific time intervals (heating cycle of duration Z=interval between actual-MAX(n+1) and actual-MAX(n)) to permit continual adaptation of the parameters.

In the case of minor fluctuations in temperature (difference A between setpoint-MAX and setpoint-MIN<1° C.) the following relationships apply: the location of actual-MIN(n) is a linear function of t-ON(n) and the slope of the temperature curve of the real temperature profile T-actual at the point in time t-ON(n), i.e., for a given slope, t-ON(n) may be selected so that a specified actual-MIN(n) is precisely attained. The location of actual-MAX(n) is a linear function of t-ON(n), the slope of the temperature curve of the temperature profile T-actual and the ON duration D, i.e., the difference between t-OFF(n) and t-ON(n). Accordingly for a given ON point in time and a given slope, t-OFF(n) or the ON duration D may be selected so that a specified actual-MAX is precisely attained.

The actual temperature T-actual can then be regulated as follows: the given setpoints are a maximum setpoint temperature setpoint-MAX and a minimum setpoint temperature setpoint-MIN. Every time a heating cycle Z is commenced the equation parameters are defined from the data of the previous cycle, i.e., t-ON(n) and t-OFF(n) or respectively D are then computed so that actual-MIN(n) and actual-MAX(n) coincides with setpoint-MIN and setpoint-MAX. The profile of the temperature curve of the real actual temperature T-actual is then monitored. Should it fail to agree with the forecast profile the ON/OFF points in time are updated accordingly. The parameters of the latest cycle equal the parameters of the previous cycle when the power flow in the radiator, the heat given off by the radiator to the surrounding room and by the heated room to the environment all remain the same. The power flow in the radiator is substantially dictated by the supply flow temperature of the transporting medium and is either constant or changes only relatively slowly. The heat given off by the radiator to the surrounding room may be assumed to be constant in the case of small changes in temperature. The heat given off by the room to the environment depends substantially on the ambient temperature which is likewise constant or changes only relatively slowly. Thus, changes in the supply flow temperature or ambient temperature are reflected in parameters which slightly change from one cycle to the next, as a result of which, changes in the ambient conditions are sensed and displayed.

It is important that setpoint-MIN and setpoint-MAX have a minimum difference A which depends on how sensitive the temperature sensor used is. For a resolution of 0.05° C. relatively easy to achieve, useful values for A are, e.g., 0.3 or 0.4° C., resulting in a regulation accuracy in principle of ±0.15° C. or ±0.2° C. respectively for T-actual. This accuracy can be further enhanced by using more sensitive temperature sensors. The control strategy in accordance with the invention thus commands a controlled temperature dither about the median setpoint temperature with maxima in setpoint-MIN and setpoint-MAX.

If a lower setpoint temperature needs to be aimed at, the ON of the heating is delayed correspondingly long until the continually precomputed actual-MIN coincides with the new setpoint-MIN.

If a higher setpoint temperature needs to be aimed at, the relationships are somewhat different. For an increase in temperature>1° C. namely, the following applies: as long as the radiator is still in the warm-up phase its energy output increases exponentially and T-actual increases likewise exponentially. Once the radiator has attained its final temperature its energy output is constant and the increase in T-actual is linear. Once the radiator is OFF, its heat output drops exponentially and the increase in T-actual is then in accordance with a negative e-function. These non-linear relationships are negligible for small increases in temperature (<1° C.), but not for a larger increase. The increase in temperature can thus no longer be considered as being a linear function of the slope of the temperature curve T-actual and of the ON duration D. However, a good approximation is obtained when assuming this dependency to be parabolic. An additional, quadratic term thus needs to be inserted in the equation of the dependencies. The corresponding additional parameter is defined from the first major jumps in temperature as measured and is then continually updated.

It is not until increases in temperature exceeding 6–8° C. are encountered that, with this approximation, computation has the tendency to short ON times so that the new setpoint temperature is not attained with only one heating cycle, a second heating cycle being necessary. Although this results in the warmup phase lasting somewhat longer, any violation of the setpoint-MAX by the actual temperature is reliable avoided, however.

By the strategy in accordance with the invention the supply flow temperature required as a minimum (difference between the temperature of the heating agent or coolant and actual temperature) may be defined to advantage from the following considerations: in the settled condition the heat output by the radiator during the ON duration D(n) is just sufficient to command the required temperature dither about the setpoint. Since the heat output is proportional to the supply flow temperature and time, the same heat is output e.g. for twice the ON duration and half the supply flow temperature. So that the regulating action is not too slow, the ON duration D(n) should not be longer than roughly twice the time interval between actual-MAX(n−1) and actual-MIN (n) (half cycle HC(n)). Expressed mathematically, D(n)=HC (n)*F, with F having a maximum value of 2. The ON duration D(n) occurring actually can thus be lengthened or shortened, depending on the circumstances, by a factor B, conversely the supply flow temperature VT(n) then needing to be elevated or lowered accordingly. The OFF point in time (t-OFF(n+1)) is defined such that the ON duration (D(n+1)) is lengthened by the factor B when the supply flow temperature VT is lowered and shortened by the factor B, when the supply flow temperature VT is raised.

The control strategy as described results in the setpoint temperature being maintained very accurately after but two or three heating cycles. It is particularly in the case of setpoint temperatures changing very often or greatly fluctuating ambient conditions that this accuracy may be further enhanced when the parameters, once having been found, are tabulated memorized. By comparing the parameters as found actual to those as memorized the parameters probably needed may also be forecast and correspondingly preset even when major changes take place. Once the control strategy has been operated for some time with changing setpoint temperatures and ambient conditions, the tabulation then contains as good as all operating parameters as needed. Even after a lengthy idle period the regulation is then instantly set to an optimum.

The control strategy as described by way of a heating system, as an example, may be put to use slightly modified also for regulating cooling or air-conditioning systems. For regulating a cooling system the equations merely need to be adapted by swapping the sign of a few parameters. Otherwise the same strategy applies as above.

A wealth of modifications and more sophisticated aspects relating, e.g. to the nature of the parameters as measured or defined is, of course, possible without departing from the gist of the invention. Thus, instead of defining the cited optimum OFF point in time of the temperature controller relative to the ON point in time an optimum OFF temperature or, indeed, an absolute OFF point in time—relative to the time profile—may be defined. What is essential to the invention in any case is that the actual temperature of a room, object or fluid to be temperature-controlled is prompted to execute a controlled dither about a median setpoint temperature by signaling the temperature controller periodically ON/OFF, whereby the actual temperature resulting in response to the ON/OFF switching of the temperature controller in the room, object or fluid to be temperature-controlled is continually monitored and made use of to determine the next ON/OFF points in time of the temperature controller.

What is claimed is:

1. A smart control strategy for regulating a temperature controller for supplying or exhausting heat to/from a room, object or fluid in which a maximum temperature setpoint (setpoint-MAX) and a minimum temperature setpoint (setpoint-MIN) is specified and the time profile of the actual temperature of the room, object or fluid is regularly measured, comprising the following steps:

a) defining an nth ON point in time (t-ON(n)) at which the temperature controller is to be signaled ON, b) defining an nth OFF point in time (t-OFF(n)) at which the temperature controller is to be signaled OFF, c) sensing the two nth extreme values (actual-MAX(n) and actual-MIN(n)) resulting after ON of the temperature controller in the actual temperature profile in which the actual temperature has a local minimum and a local maximum, d) determining the 1st derivation of the temperature profile with time in the nth ON point in time (t-ON(n)), e) determining the optimum nth ON/OFF points in time (t-optON(n) and t-optOFF(n)) from the values of the nth OFF point in time (t-OFF(n)) and the nth ON point in time (t-ON(n)), the two nth extreme values (actual-MAX(n) and actual-MIN(n)) in the temperature profile and the 1st derivation of the temperature profile with time in the nth ON point in time (t-ON(n)) at which for the nth extreme value (actual-MAX(n)) a local maximum in the temperature profile equaling the specified maximum temperature setpoint (setpoint MAX(n)) and for the nth extreme value (actual-MIN(n)) a local minimum in the temperature profile equaling the specified minimum temperature setpoint (setpoint MIN(n)) is attained, f) incrementing n by 1 and repeating the steps a) to f) taking into account the determined nth ON/OFF points in time (t-optON(n) and t-optOFF(n)) as well as the 1st derivation of the temperature profile with time in the nth ON point in time (t-ON(n)) in establishing the n+1 ON/OFF points in time (t-ON(n+1) and t-OFF(n+1)).

2. The control strategy as set forth in claim 1, characterized in that with no change in the temperature setpoints (setpoint-MAX/MIN) the n+1th ON point in time (t-ON(n+1)) is set equal to the optimum nth ON point in time (t-optON(n)) and/or the n+1th OFF point in time (t-OFF(n+1)) is set equal to the optimum nth OFF point in time (t-optOFF(n)).

3. The control strategy as set forth in claim 1, characterized by in addition establishing the time interval between the ON point in time (t-ON(n)) and the local minimum (actual-MIN(n)) when the temperature controller is used for heating or, respectively between the ON point in time (t-ON(n)) and the local maximum (actual-MAX(n)) when the temperature controller is used for cooling, and taking into account this time interval when defining the n+1th OFF point in time t-OFF(n+1)).

4. The control strategy as set forth in claim 1, characterized in that for defining the n+1th ON point in time (t-ON(n+1)) at least the three values of the nth, n−1th and n−2th optimum ON point in time (t-optON(n), t-optON(n−1) and t-optON(−2)) are arranged in size and the mean value selected as the value for the n+1th ON point in time (t-ON(n+1)).

5. The control strategy as set forth in claims 1 characterized in that for defining the n+1th OFF point in time (t-OFF(n+1)) at least the three values of the nth, n−1th and n−2th optimum OFF point in time (t-optOFF(n), t-optOFF(−1) and t-optOFF(−2)) are arranged in size and the mean value selected as the value for the n+1th OFF point in time (t-OFF(n+1)).

6. The control strategy as set forth in claim 1 characterized in that a limit value is specified for the $1^{st}$ derivation of the temperature profile with time at the nth ON point in time (t-ON(n)) which when violated results in the values measured thereafter for defining the optimum ON/OFF points in time (t-optON(n) and t-optOFF(n)), until the occurrence of a temperature drop below an absolute temperature value or a change in the temperature profile, no longer being taken into account.

7. The control strategy as set forth in claim 1, characterized in that the user of the strategy merely needs to specify one temperature setpoint from which the values of the maximum and minimum temperature setpoint (setpoint-MAX and setpoint-MIN) are defined.

8. The control strategy as set forth in claim 1, characterized in that the temperature setpoints (setpoint-MAX and setpoint-MIN) as well as the nth ON/OFF points in time (t-ON(n) and t-OFF(n)) defined lastly relative to said setpoints (setpoint-MAX and setpoint-MIN) are memorized in a memory unit and that when there is a change in the temperature setpoints (setpoint-MAX and setpoint-MIN) the memory is checked to see whether the nth ON/OFF points in time (t-ON(n) and t-OFF(n)) are already memorized for the changed temperature setpoints (setpoint-MAX and setpoint-MIN) which are then taken over as the ON/OFF points in time for the first cycle of the control strategy with the new setpoints.

9. The control strategy as set forth in claim 1, characterized in that the nth ON/OFF points in time (t-ON(n) and (t-OFF(n)) are defined by means of a central analyzer/control unit with which corresponding control commands for signaling the temperature controller ON/OFF are also generated.

10. The control strategy as set forth in claim 9, characterized in that said control commands are transmitted from said central analyzer/control unit to said temperature controller wireless.

11. The control strategy as set forth in claim 9, characterized in that said control commands are transmitted from said central analyzer/control unit to said temperature controller wired.

12. A smart control strategy for regulating a temperature controller for supplying or exhausting heat to/from a room, object or fluid in which a maximum temperature setpoint (setpoint-MAX) and a minimum temperature setpoint (setpoint-MIN) is specified and the time profile of the actual temperature of the room, object or fluid is regularly measured, comprising the following steps:

a) defining an nth ON point in time (t-ON(n)) at which the temperature controller is to be signaled ON, b) defining an nth OFF point in time (t-OFF(n)) at which the temperature controller is to be signaled OFF, c) sensing the two nth extreme values (actual-MAX(n) and actual-MIN(n)) resulting after ON of the temperature controller in the actual temperature profile in which the actual temperature has a local minimum and a local maximum, d) determining the 1st derivation of the temperature profile with time in the nth ON point in time (t-ON(n)), e) determining the optimum nth ON/OFF points in time (t-optON(n) and t-optOFF(n)) from the values of the nth OFF point in time (t-OFF(n)) and the nth ON point in time (t-ON(n)), the two nth extreme values (actual-MAX(n) and actual-MIN(n)) in the temperature profile and the 1st derivation of the temperature profile with time in the nth ON point in time (t-ON(n)) at which for the nth extreme value (actual-MAX(n)) a local maximum in the temperature profile equaling the specified maximum temperature setpoint (setpoint MAX(n)) and for the nth extreme value (actual-MIN(n)) a local minimum in the temperature profile equaling the specified minimum temperature setpoint (setpoint MIN(n)) is attained, f) incrementing n by 1 and repeating the steps a) to f) taking into account the determined nth ON/OFF points in time (t-optON(n) and t-optOFF(n)) as well as the 1st derivation of the temperature profile with time in the nth ON point in time (t-ON(n)) in establishing the n+1 ON/OFF points in time (t-ON(n+1)) and t-OFF(n+1)), wherein after ON of the temperature controller at the ON point in time (t-ON(n)) the 1st derivation of the temperature profile is continually sensed with time and the temperature controller is signaled OFF only when timeout of the defined OFF point in time (t-OFF(n)) is attained and a local minimum (actual-MIN(n)) and local maximum (actual-MAX(n)) has occurred in the heating temperature profile and cooling temperature profile respectively, and the 1st derivation of the temperature profile with time is greater or smaller than a specified value in hearing and cooling respectively, and the actual temperature is greater than the minimum temperature setpoint (setpoint-MIN) and smaller than the maximum temperature setpoint (setpoint-MAX) in heating and cooling respectively.

13. The control strategy as set forth in claim 12, characterized in that no OFF point in time (t-OFF(n)) is defined, and that instead, after ON of the temperature controller at the ON point in time (t-ON(n)) the 1st derivation of the temperature profile is continually defined with time and the temperature controller signaled OFF only when a local minimum (actual-MIN(n)) or local maximum (actual-MAX(n)) has occurred in the heating temperature profile and cooling temperature profile respectively, and the 1st derivation of the temperature profile with time is greater or smaller than a specified value in heating and cooling respectively, and the actual temperature in heating is greater than the minimum temperature setpoint (setpoint-MIN) or smaller than the maximum temperature setpoint (setpoint-MAX) in heating and cooling respectively.

14. A smart control strategy for regulating a temperature controller for supplying or exhausting heat to/from a room, object or fluid in which a maximum temperature setpoint (setpoint-MAX) and a minimum temperature setpoint (setpoint-MIN) is specified and the time profile of the actual temperature of the room, object or fluid is regularly measured, comprising the following steps:

a) defining an nth ON point in time (t-ON(n)) at which the temperature controller is to be signaled ON, b) defining an nth OFF point in time (t-OFF(n)) at which the temperature controller is to be signaled OFF, c) sensing the two nth extreme values (actual-MAX(n) and actual-MIN(n)) resulting after ON of the temperature controller in the actual temperature profile in which the actual temperature has a local minimum and a local maximum, d) determining the 1st derivation of the temperature profile with time in the nth ON point in time (t-ON(n)), e) determining the optimum nth ON(OFF points in time (t-optON(n) and t-optOFF(n)) from the values of the nth OFF point in time (t-OFF(n)) and the nth ON point in time (t-ON(n)), the two nth extreme values (actual-MAX(n) and actual-MIN(n)) in the temperature profile and the 1st derivation of the temperature profile with time in the nth ON point in time (t-ON(n)) at which for the nth extreme value (actual-MAX(n)) a local maximum in the temperature profile equaling the specified maximum temperature setpoint (setpoint MAX(n)) and for the nth extreme value (actual-MIN(n)) a local minimum in the temperature profile equaling the specified minimum temperature setpoint (setpoint MIN(n)) is attained, f) incrementing n by 1 and repeating the steps a) to f) taking into account the determined nth ON/OFF points in time (t-optON(n) and t-optOFF(n)) as well as the 1st derivation of the temperature profile with time in the nth ON point in time (t-ON(n)) in establishing the n+1 ON/OFF points in time (t-ON(n+1)) and t-OFF(n+1)), the control strategy being used regulating temperature controllers through which a heating agent/coolant flows, the temperature of the heating agent/coolant being adjustable, and the difference required between the heating agent/coolant temperature and the actual temperature (termed supply flow temperature (VT) in the following) being defined and set from the time interval as measured between t-ON(n) and t-OFF(n) (termed ON duration (D(n)) in the following), as well as from the time interval as measured between the local extreme values actual-MAX(n-1) and actual-MIN(n)—when the temperature controller is used for heating—or, respectively as well as from the time interval as measured between the local extreme values actual-MIN(n) and actual-MAX(n) —when the temperature controller is used for cooling (termed half cycle (HC(n)) in the following) comprising the following steps:

a) lowering the supply flow temperature (VT) by a fraction (B) and modifying the heating agent/coolant temperature accordingly if the ON duration (D(n)) is smaller than the half cycle (HC(n)) multiplied by a factor (F), b) elevating the supply flow temperature (VT) by a fraction (B) and modifying the heating agent/coolant temperature accordingly if the ON duration (D(n)) is greater than the half cycle (HC(n)) multiplied by a factor (F), c) redefining the OFF point in time (t-OFF(n+1)) so that the ON duration (D(n+1)) in case a) is lengthened by the fraction (B) and in case b) is shortened by the fraction (B).

* * * * *